United States Patent
Cudak et al.

(10) Patent No.: US 9,604,642 B2
(45) Date of Patent: Mar. 28, 2017

(54) POSITIONING AUTONOMOUS VEHICLES BASED ON FIELD OF VIEW

(71) Applicant: LENOVO ENTERPRISE SOLUTIONS (SINGAPORE) PTE. LTD., Singapore (SG)

(72) Inventors: Gary D. Cudak, Creedmoor, NC (US); David G. Dean, Raleigh, NC (US); Christopher J. Hardee, Raleigh, NC (US); William E. Lohmeyer, Jr., Apex, NC (US); Bryan M. Reese, Durham, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 80 days.

(21) Appl. No.: 14/264,808

(22) Filed: Apr. 29, 2014

(65) Prior Publication Data
US 2015/0309510 A1 Oct. 29, 2015

(51) Int. Cl.
*G01C 22/00* (2006.01)
*G05D 1/00* (2006.01)
(Continued)

(52) U.S. Cl.
CPC ............ *B60W 30/16* (2013.01); *G08G 1/163* (2013.01); *G08G 1/166* (2013.01); *B60W 2750/308* (2013.01); *B60W 2750/40* (2013.01)

(58) Field of Classification Search
CPC ........ G08G 1/161; G08G 1/164; G08G 1/166; G08G 1/167; G01S 13/931; G01S 17/023; G01S 2013/9332
(Continued)

(56) References Cited

U.S. PATENT DOCUMENTS 5,757,290 A * 5/1998 Watanabe ............ G08G 1/0969
340/988
6,169,572 B1 * 1/2001 Sogawa ................ G01S 3/7864
348/113
(Continued)

FOREIGN PATENT DOCUMENTS

WO WO 2006/090896 A1 8/2006

OTHER PUBLICATIONS

Tech News Daily, "Autonomous Cars Patrol Israeli Border", news. discovery.com (online publication), Mar. 18, 2013, 2 pages, URL: http://news.discovery.com/autos/military-vehicles/autonomous-cars-patrol-israeli-border-130318.htm.
(Continued)

*Primary Examiner* — Khoi Tran
*Assistant Examiner* — Jorge Peche
(74) *Attorney, Agent, or Firm* — Brandon C. Kennedy; Douglas W. Robinson; Kennedy Lenart Spraggins LLP

(57) ABSTRACT

Positioning autonomous vehicles based on field of view, including: identifying, by a vehicle management module, one or more critical sight lines for a subject vehicle, each critical sight line representing a boundary of an area of space surrounding the subject vehicle; determining, by the vehicle management module, physical location information for one or more surrounding vehicles; determining, by the vehicle management module in dependence upon the physical location information for one or more surrounding vehicles, whether one or more surrounding vehicles are located within the area of space surrounding the subject vehicle; and responsive to determining that one or more surrounding vehicles are located within the area of space surrounding the subject vehicle, altering a location of the subject vehicle relative to at least one of the surrounding vehicles.

12 Claims, 6 Drawing Sheets

(51) Int. Cl.
*B60W 30/16* (2012.01)
*G08G 1/16* (2006.01)

(58) Field of Classification Search
USPC ... 701/1, 23, 28, 96, 300, 301; 348/48, 148; 382/104; 340/436, 903
See application file for complete search history.

(56) References Cited

U.S. PATENT DOCUMENTS

| | | | | |
|---|---|---|---|---|
| 7,979,174 | B2* | 7/2011 | Fregene | B60W 30/16 701/23 |
| 8,880,273 | B1* | 11/2014 | Chatham | G06K 9/00798 701/23 |
| 2002/0198632 | A1* | 12/2002 | Breed | B60N 2/2863 701/1 |
| 2003/0191568 | A1* | 10/2003 | Breed | B60W 40/06 701/36 |
| 2004/0148063 | A1* | 7/2004 | Patchell | B60T 17/22 701/1 |
| 2005/0060069 | A1* | 3/2005 | Breed | B60N 2/2863 701/408 |
| 2005/0134440 | A1* | 6/2005 | Breed | B60N 2/2863 340/435 |
| 2006/0025897 | A1* | 2/2006 | Shostak | B60C 23/005 701/1 |
| 2008/0150786 | A1* | 6/2008 | Breed | B60N 2/2863 342/53 |
| 2008/0161986 | A1* | 7/2008 | Breed | G08G 1/161 701/23 |
| 2008/0161987 | A1* | 7/2008 | Breed | G08G 1/161 701/27 |
| 2008/0165018 | A1* | 7/2008 | Breed | G08G 1/161 340/573.1 |
| 2009/0048768 | A1* | 2/2009 | Taguchi | G08G 1/166 701/117 |
| 2009/0326819 | A1* | 12/2009 | Taguchi | B60W 40/04 701/301 |
| 2010/0106356 | A1* | 4/2010 | Trepagnier | G01S 17/023 701/25 |
| 2010/0280751 | A1* | 11/2010 | Breed | G08G 1/161 701/414 |
| 2010/0283663 | A1* | 11/2010 | Sasabuchi | G01S 13/588 342/70 |
| 2011/0251768 | A1* | 10/2011 | Luo | B60W 30/12 701/70 |
| 2012/0101680 | A1 | 4/2012 | Trepagnier et al. | |
| 2012/0109423 | A1* | 5/2012 | Pack | G05D 1/0061 701/2 |
| 2012/0136510 | A1* | 5/2012 | Min | G01S 17/88 701/2 |
| 2012/0143488 | A1* | 6/2012 | Othmezouri | B60T 7/22 701/301 |
| 2012/0229302 | A1* | 9/2012 | Sri-Jayantha | G08G 1/0112 340/905 |
| 2012/0327239 | A1* | 12/2012 | Inoue | B60R 1/00 348/148 |
| 2013/0046430 | A1* | 2/2013 | Bageshwar | G05D 1/0231 701/23 |
| 2013/0063257 | A1* | 3/2013 | Schwindt | B60W 30/095 340/425.5 |
| 2013/0083197 | A1* | 4/2013 | Yamakage | G06T 7/0042 348/148 |
| 2013/0278769 | A1* | 10/2013 | Nix | H04N 7/18 348/148 |
| 2014/0039718 | A1* | 2/2014 | Cheng | G08G 1/162 701/1 |
| 2014/0153816 | A1* | 6/2014 | Cohen | G06T 7/0075 382/154 |

OTHER PUBLICATIONS

Emspak, J., "Driverless Trucks Debut in Japan", news.discovery.com (online publication), Mar. 4, 2013, 1 page, URL: http://news.discovery.com/autos/future-of-transportation/driverless-trucks-debut-in-japan-130304.htm.

AFP, "Self-Driving Cars Head Down Spanish Motorway", news.discovery.com (online publication), May 30, 2012, 2 pages, URL: http://news.discovery.com/autos/drive/volvo-self-driving-car-120530.htm.

Liu, C., et al., "Optimisation based control framework for autonomous vehicles: algorithm and experiment", Proceedings of the 2010 IEEE International Conference on Mechatronics and Automation, Aug. 4-7, 2010, pp. 1030-1035, Conference Location: Xi'an, China, IEEE Xplore Digital Library, DOI: 10.1109/ICMA.2010.5588100.

Fernandes, P., et al., "Platooning of Autonomous Vehicles with Intervehicle Communications in SUMO Traffic Simulator", 13th International IEEE Annual Conference on Intelligent Transportation Systems, Sep. 19-22, 2010, pp. 1313-1318, Conference Location: Madeira Island, Portugal, IEEE Xplore Digital Library, DOI: 10.1109/ITSC.2010.5625277.

Dresner, K., et al., "Sharing the Road: Autonomous Vehicles Meet Human Drivers", In the Twentieth International Joint Conference on Artificial Intelligence (IJCAI 07), Jan. 2007, pp. 1263-1268, Conference Location: Hyderabad, India, Morgan Kaufmann Publishers Inc. San Francisco, CA, USA, ACM Digital Library, URL: http://dl.acm.org/citation.cfm?id=1625275.1625480.

Bertozzi, M., et al., "Artificial Vision in Road Vehicles", Proceedings of the IEEE, Jul. 2002, pp. 1258-1271, vol. 90, No. 7, IEEE Xplore Digital Library, DOI: 10.1109/JPROC.2002.801444.

* cited by examiner

POSITIONING AUTONOMOUS VEHICLES BASED ON FIELD OF VIEW

BACKGROUND OF THE INVENTION

Field of the Invention

The field of the invention is data processing, or, more specifically, methods, apparatus, and products for positioning autonomous vehicles based on field of view.

Description of Related Art

Autonomous cars are becoming closer to being a mainstream product and states are now passing laws to allow the use of autonomous vehicles. These vehicles are very advanced and use a multitude of sensors and software to operate. Because autonomous vehicles include a multitude of sensors and software to operate, autonomous vehicles may be able to rapidly sense and process information such that autonomous vehicles can travel in a very compact manner. For instance, autonomous vehicles travelling at highway speeds may only need to be spaced several feet apart whereas human operated vehicles should be spaced much farther apart to ensure safe travel. For a human operated vehicle travelling in such an environment where autonomous vehicles are spaced closely together, there can be additional risks that arise as a result of trying to fit in with the behavior of autonomous vehicles. For example, the compact nature of travelling patterns for autonomous vehicles can create line of sight issues for human drivers.

SUMMARY OF THE INVENTION

Methods, apparatuses, and products for positioning autonomous vehicles based on field of view, including: identifying, by a vehicle management module, one or more critical sight lines for a subject vehicle, each critical sight line representing a boundary of an area of space surrounding the subject vehicle; determining, by the vehicle management module, physical location information for one or more surrounding vehicles; determining, by the vehicle management module in dependence upon the physical location information for one or more surrounding vehicles, whether one or more surrounding vehicles are located within the area of space surrounding the subject vehicle; and responsive to determining that one or more surrounding vehicles are located within the area of space surrounding the subject vehicle, altering a location of the subject vehicle relative to at least one of the surrounding vehicles.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
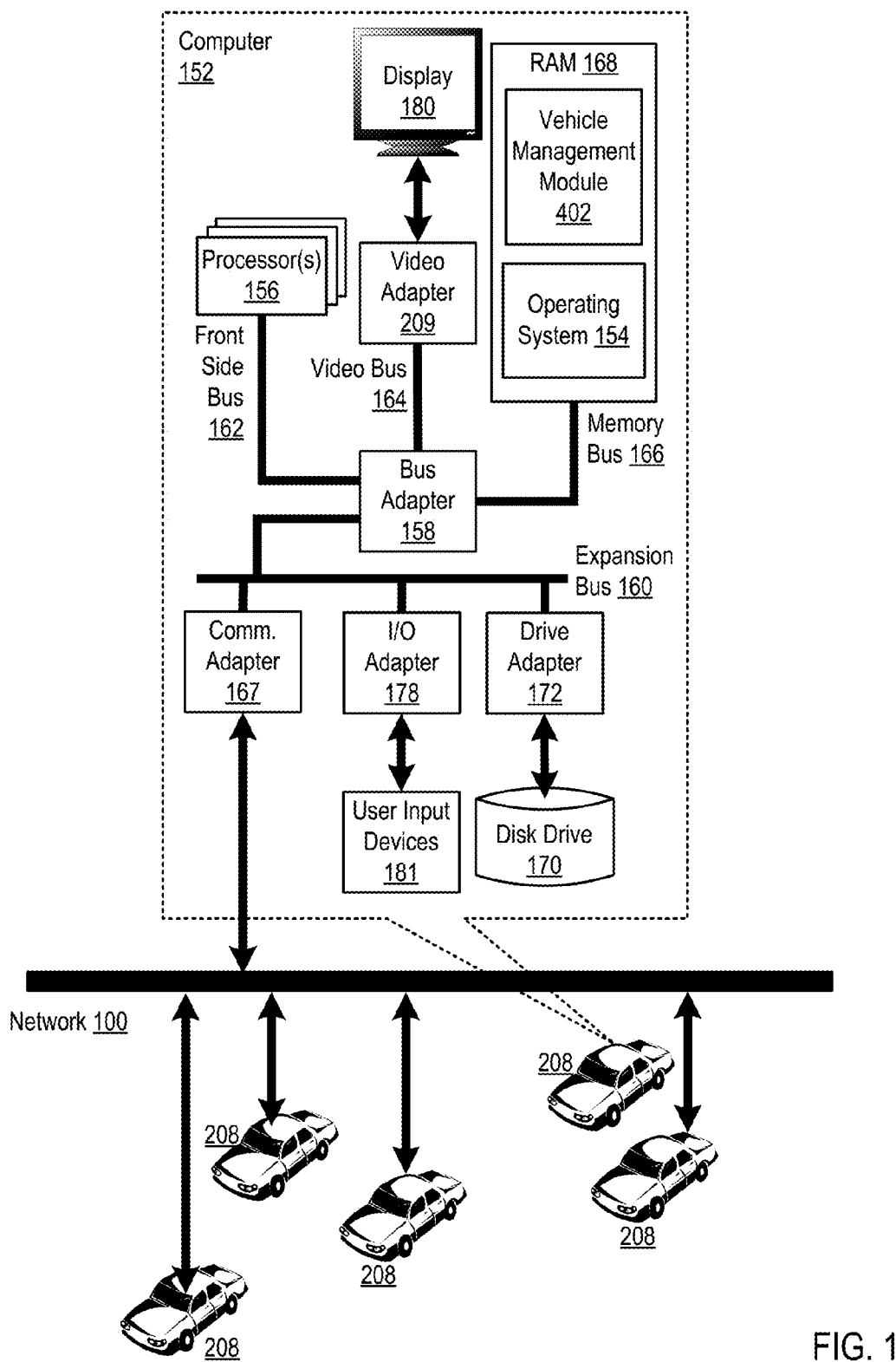
FIG. 1 sets forth a network diagram of a system for positioning autonomous vehicles based on field of view according to embodiments of the present invention.

Example methods, apparatuses, and products for positioning autonomous vehicles based on field of view in accordance with the present invention are described with reference to the accompanying drawings, beginning with FIG. 1. FIG. 1 sets forth a network diagram of a system for positioning autonomous vehicles based on field of view according to embodiments of the present invention. The system of FIG. 1 includes a plurality of autonomous vehicles (208). Although not illustrated for each autonomous vehicle (208), each autonomous vehicle (208) includes automated computing machinery in the form of an example computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for positioning autonomous vehicles based on field of view according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, touchscreen displays, and so on. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. The example computer (152) may also include various other components not shown here such as an altimeter, an accelerometer, a compass, a Global Positioning System ('GPS') receiver, and so on.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for positioning autonomous vehicles based on field of view according to embodiments of the present invention include modems for wired dial-up communications, Ethernet (IEEE 802.3) adapters for wired data communications, 802.11 adapters for wireless data communications, adapters for communicating over mobile communications networks, and so on. Other example protocols which may be supported by the communication adapter include: GSM (Global System For Mobile Communications) and CDMA (Code Division Multiple Access) protocols.

Stored in RAM (168) is a vehicle management module (402), a module of computer program instructions that, when executed by the processor (156), causes the computer (152) to operate for positioning autonomous vehicles based on field of view in accordance with embodiments of the present invention. The vehicle management module (402) may be configured for positioning autonomous vehicles based on field of view by: identifying one or more critical sight lines for a subject vehicle, each critical sight line representing a boundary of an area of space surrounding the subject vehicle; determining physical location information for one or more surrounding vehicles; determining, in dependence upon the physical location information for one or more surrounding vehicles, whether one or more surrounding vehicles are located within the area of space surrounding the subject vehicle that is bounded by the one or more critical sight lines; and responsive to determining that one or more surrounding vehicles are located within the area of space surrounding the subject vehicle, altering a location of the subject vehicle relative to at least one of the surrounding vehicles as described in greater detail below.

Also stored in RAM (168) is an operating system (154). Operating systems useful in computers configured for positioning autonomous vehicles based on field of view according to embodiments of the present invention include UNIX™, Linux™, Microsoft XP™, AIX™, IBM's i5/OS™, and others as will occur to those of skill in the art. The operating system (154) and vehicle management module (402) in the example of FIG. 1 are shown in RAM (168), but many components of such software typically are stored in non-volatile memory also, such as, for example, on a disk drive (170).

The arrangement of autonomous vehicles and other components making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
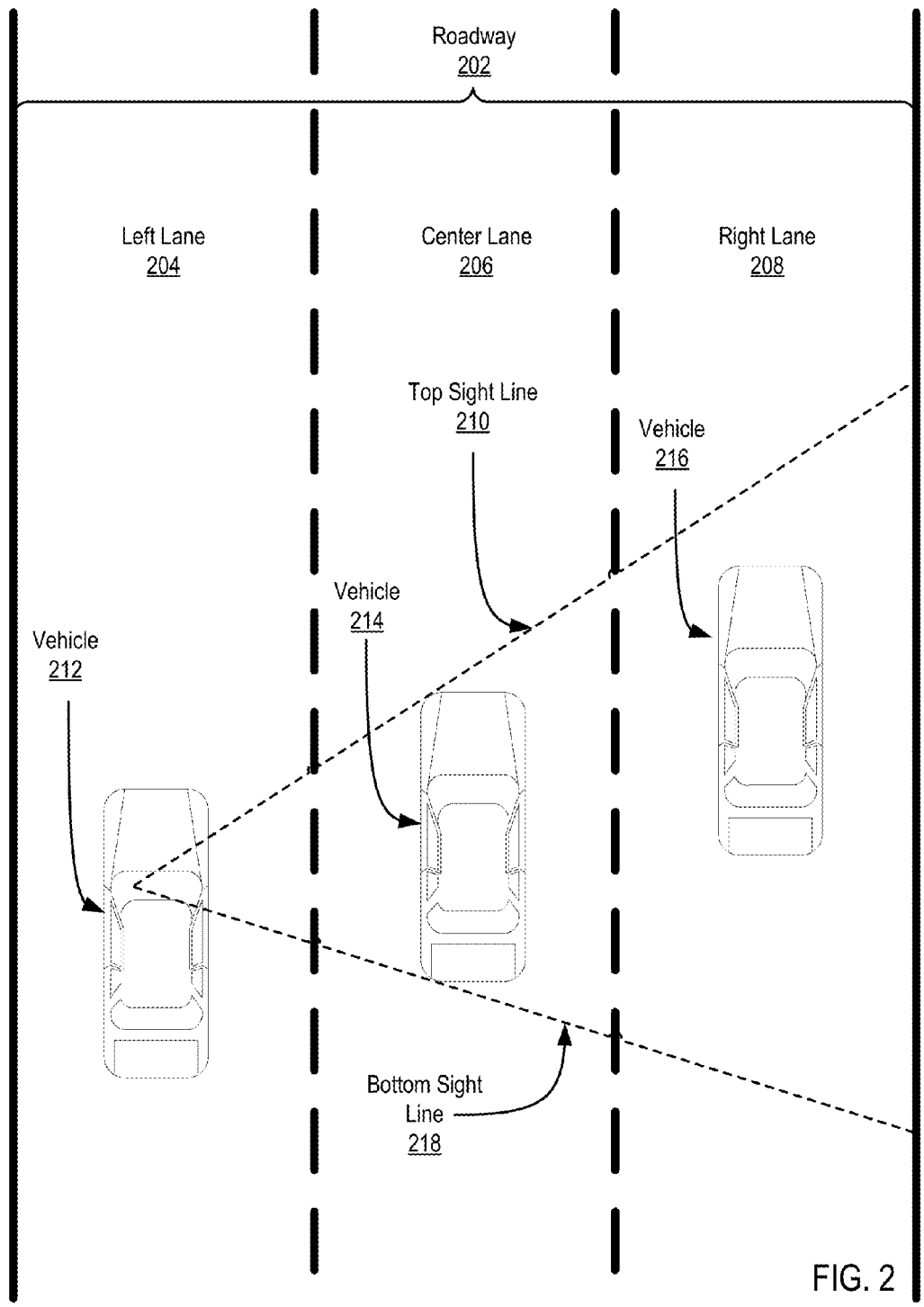
FIG. 2 sets forth a diagram of a plurality of vehicles navigating a roadway.

For further explanation, FIG. 2 sets forth a diagram of a plurality of vehicles (212, 214, 216) navigating a roadway (202). In the example depicted in FIG. 2, one or more of the vehicles (212, 214, 216) may be embodied as an autonomous vehicle as described above, one or more of the vehicles (212, 214, 216) may be embodied as a standard vehicle that require a human driver to operate the vehicle (212, 214, 216), or any combination thereof.

The example depicted in FIG. 2 illustrates a plurality of sight lines (210, 218) from the perspective of the vehicle (212) in the left lane (204) of the roadway (202). In such an example, the top sight line (210) runs along the front fender of the vehicle (214) that is travelling in the center lane (206) of the roadway (202) while the bottom sight line (218) runs along the back fender of the vehicle (214) that is travelling in the center lane (206) of the roadway (202). In such an example, any area of the roadway (202) that is between the top sight line (210) and the bottom sight line (218), on the side of the vehicle (214) travelling in the center lane (206) that is opposite of the vehicle (212) travelling in the left lane (204) of the roadway (202), represents an area of limited visibility for a driver of the vehicle (212) in the left lane (204) of the roadway (202). The vehicle (212) in the left lane (204) of the roadway (202) may experience limited visibility of such an area as any object between each sight line (210, 218) and to the right of the vehicle (214) in the center lane (206) may be blocked from the view of the driver of the vehicle (212) in the left lane (204) of the roadway (202), by virtue of the vehicle (214) in the center lane (206) obstructing the driver's view of such an area. As such, a driver of the vehicle (212) in the left lane (204) of the roadway (202) may not be able to see the vehicle (216) in the right lane (208) of the roadway (202), as the driver's view of the vehicle (216) in the right lane (208) of the roadway (202) is blocked by the vehicle (214) in the center lane (206) of the roadway (202).

Readers will appreciate that while the example described above refers to the field of vision of a driver of the vehicle (212) in the left lane (204) of the roadway (202), the relative positioning of the vehicles (212, 214, 216) may be problematic even in a situation in which each of the vehicles (212, 214, 216) is an autonomous vehicle. For example, any area of the roadway (202) that is between each sight line (210, 218) and to the right of the vehicle (214) in the center lane (206) may be blocked from monitoring by a sensor in the vehicle (212) in the left lane (204) that utilizes radar or another technology that utilizes line of sight monitoring of spaces. As such, from the perspective of the vehicle (212) travelling in the left lane (204) of the roadway (202), it may be desirable that no vehicles travel in the area of the roadway (202) that is between each sight line (210, 218) and to the right of the vehicle (214) in the center lane (206), as such an area may not be reliably monitored by a driver of the vehicle (212) travelling in the left lane (204) or reliably monitored by the vehicle (212) travelling in the left lane (204) itself.

Figure 3:
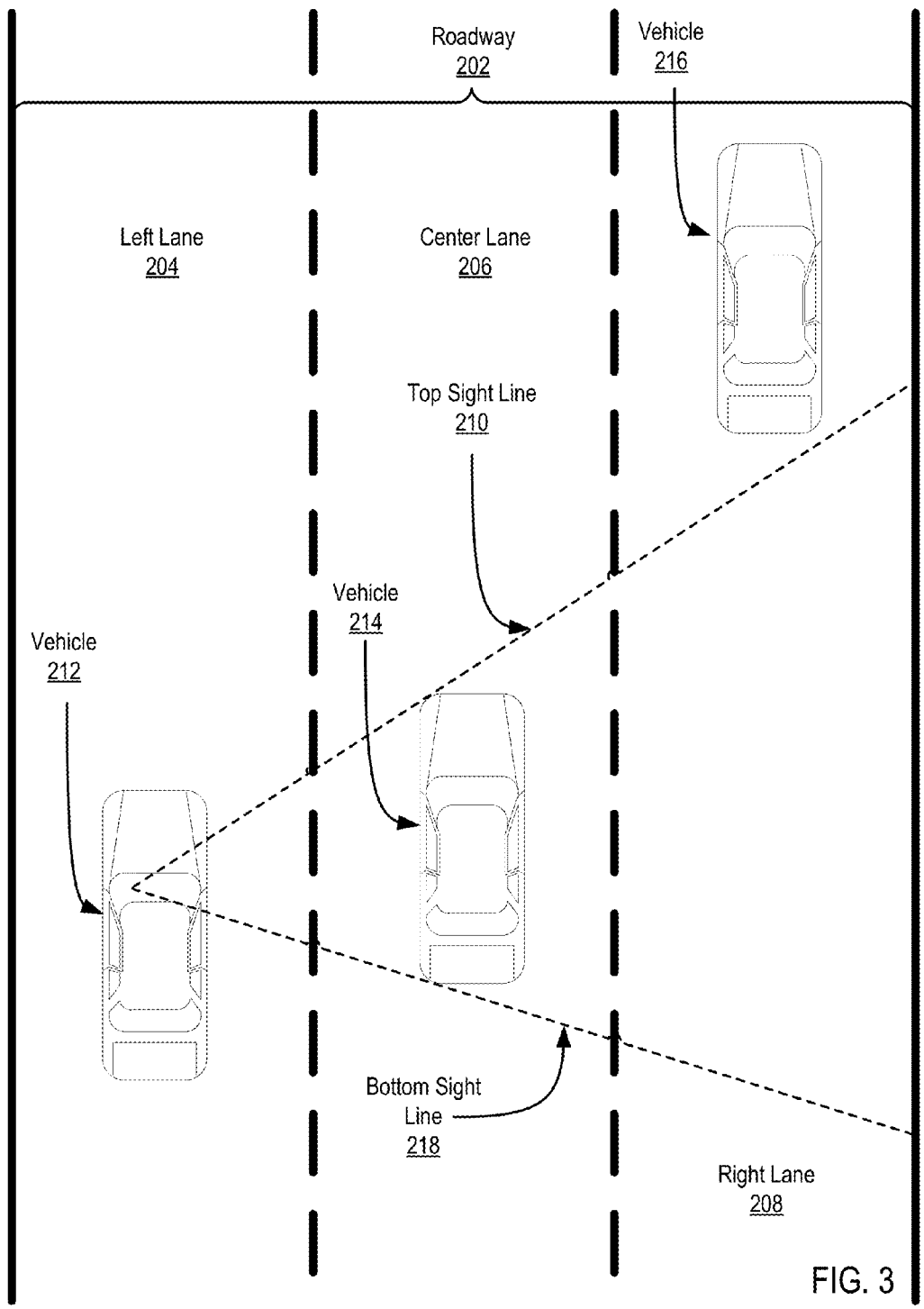
FIG. 3 sets forth an additional diagram of a plurality of vehicles navigating a roadway.

For further explanation, FIG. 3 sets forth an additional diagram of a plurality of vehicles (212, 214, 216) navigating a roadway (202). The example depicted in FIG. 3 is similar to the example depicted in FIG. 2. In the example depicted in FIG. 3, however, the vehicle (216) in the right lane (208) of the roadway (202) has moved relative to the other vehicles (212, 214) so as to avoid travelling in a location that may be difficult for the other vehicles (212, 214) to monitor. Readers will appreciate that while the example depicted in FIG. 3 illustrates the vehicle (216) in the right lane (208) of the roadway (202) changing its position relative to the other vehicles (212, 214), one of the other vehicles (212, 214) could have also changed its relative position so as to avoid any of the vehicles (212, 214, 216) travelling in a location that may be difficult for other vehicles (212, 214, 216) to monitor.

Figure 4:
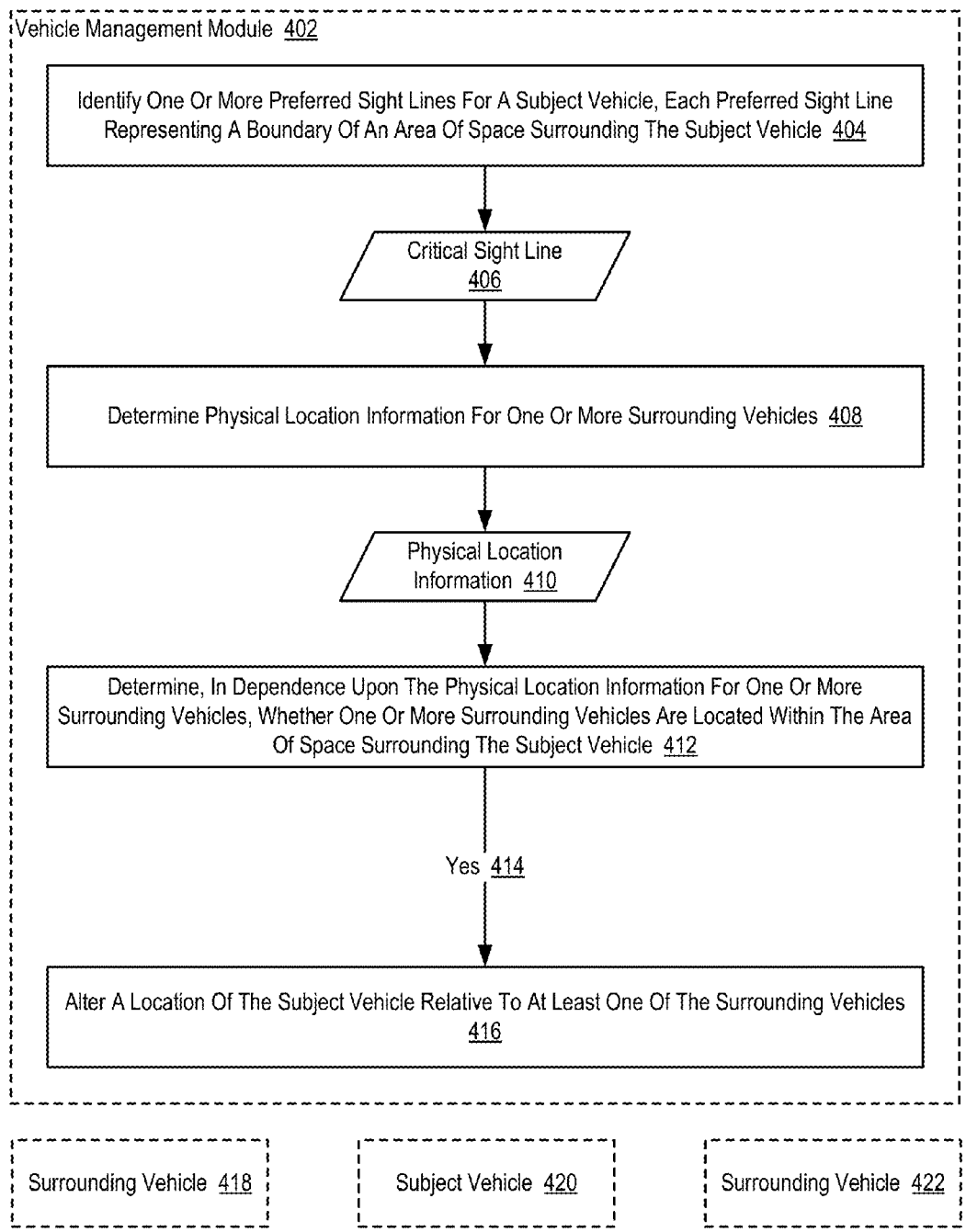
FIG. 4 sets forth a flow chart illustrating an example method for positioning autonomous vehicles based on field of view according to embodiments of the present invention.

For further explanation, FIG. 4 sets forth a flow chart illustrating an example method for positioning autonomous vehicles based on field of view according to embodiments of the present invention. An autonomous vehicle may also be referred to as a driverless car, self-driving car, robot car, or other moniker for an autonomous vehicle capable of fulfilling the human transportation capabilities of a traditional automobile, without the intervention of a human driver. Because the autonomous vehicle is 'autonomous,' the autonomous vehicle may be capable of sensing its environment and navigating without human input. Such an autonomous vehicle may utilize technologies such as radar, lidar, GPS, computer vision, and others to sense its surroundings and to identify appropriate navigation paths, as well as obstacles and relevant signage.

The example method depicted in FIG. 4 is carried out, at least in part, by a vehicle management module (402). In the example method of FIG. 4, the vehicle management module (402) may be embodied as a module of computer program instructions executing on computer hardware such as a computer processor. The vehicle management module (402) of FIG. 4 is depicted as residing outside of any of the vehicles (418, 420, 422) depicted in FIG. 4, such that the vehicle management module (402) may be part of a centralized service that communicates with a plurality of autonomous vehicles. Readers will appreciate, however, that in other embodiments the vehicle management module (402) may reside within an autonomous vehicle. For example, the vehicle management module (402) may be included as part of a broader navigation control system that carries out many of the functions performed by an autonomous vehicle. While the method depicted in FIG. 4 is described as being carried out by a vehicle management module (402), readers will appreciate that the vehicle management module (402) may also be embodied as a plurality of distinct modules that collectively perform the operations described herein.

The example method depicted in FIG. 4 includes identifying (404), by a vehicle management module (402), one or more critical sight lines (406) for a subject vehicle (420). Each critical sight line (406) in FIG. 4 represents a boundary of an area of space surrounding the subject vehicle (420). In the example method of FIG. 4, the area of space surrounding the subject vehicle (420) that is defined by the one or more critical sight lines (406) is an area of space that may be difficult for subject vehicle (420) or a driver of the subject vehicle (420) to monitor. Such an area of space may be difficult to monitor, for example, because of the relative position of another vehicle (418, 422) that blocks the ability of the subject vehicle (420) or the driver of the subject vehicle (420) to monitor such a space. Referring to the example depicted in FIG. 2, any area of the roadway (202 of FIG. 2) that is between each sight line (210, 218 of FIG. 2) and to the right of the vehicle (214 of FIG. 2) in the center lane (206 of FIG. 2) may be such an area of space that is difficult to monitor from the perspective of the vehicle (212 of FIG. 2) in the left lane (204 of FIG. 2) of the roadway (202 of FIG. 2).

In the example method depicted in FIG. 4, identifying (404) one or more critical sight lines (406) for a subject vehicle (420) may be carried out by the vehicle management module (402) determining the location, dimensions, or other characteristics of the one or more surrounding vehicles (418, 422). The vehicle management module (402) may determine the location, dimensions, or other characteristics of the one or more surrounding vehicles (418, 422), for example, through the use of one or more sensors on the subject vehicle (420). Such sensors may utilize radar, lidar, or other technologies to determine the location of one or more surrounding vehicles (418, 422) relative to such a sensor, to determine the dimensions of the one or more surrounding vehicles (418, 422), to determine the angle between the sensor and the portion of the surrounding vehicles (418, 422) that would prohibit monitoring the space on the side of the vehicle that is opposite from such a sensor, and so on. In such an example, the one or more critical sight lines (406) for a subject vehicle (420) may be identified (404) to be a line between the sensor of the subject vehicle (420) and the edges of the one or more surrounding vehicles (418, 422) that block the sensor from monitoring areas of space that are on the opposite side of the one or more surrounding vehicles (418, 422) relative to the sensor.

The example method depicted in FIG. 4 also includes determining (408), by the vehicle management module (402), physical location information (410) for one or more surrounding vehicles (418, 422). The physical location information (410) for one or more surrounding vehicles (418, 422) can include, for example, the GPS coordinates of the one or more surrounding vehicles (418, 422), a relative position to one of the other surrounding vehicles (418, 422), a relative position to the subject vehicle (420), and so on. In such an example, the physical location information (410) for one or more surrounding vehicles (418, 422) may be communicated from one or more of the surrounding vehicles (418, 422) to the vehicle management module (402) via a data communications network, the physical location information (410) for one or more surrounding vehicles (418, 422) may be communicated from the one or more surrounding vehicles (418, 422) to the vehicle management module (402) via a direct communications link between the one or more surrounding vehicles (418, 422) and the vehicle management module (402), and so on. In such a way, the vehicle management module (402) may learn of the physical location of the one or more surrounding vehicles (418, 422), even if the surrounding vehicles (418, 422) are physically located in an area that is bound by the critical sight lines (406) for the subject vehicle (420).

Consider the example depicted above with reference to FIG. 2. In such an example, a vehicle management module in the vehicle (212 of FIG. 2) in the left lane (204 of FIG. 2) of the roadway (202 in FIG. 2) may receive physical location information describing the location of the vehicle (216 of FIG. 2) in the right lane (208 of FIG. 2) of the roadway (202 in FIG. 2) via a data communications network. In such a way, the vehicle management module in the vehicle (212 of FIG. 2) in the left lane (204 of FIG. 2) of the roadway (202 in FIG. 2) may become aware of the presence of the vehicle (216 of FIG. 2) in the right lane (208 of FIG. 2) of the roadway (202 in FIG. 2), in spite of the fact that the vehicle (216 of FIG. 2) in the right lane (208 of FIG. 2) of the roadway (202 in FIG. 2) may not be detectable by one or more sensors in the vehicle (212 of FIG. 2) in the left lane (204 of FIG. 2) of the roadway (202 in FIG. 2).

The example method depicted in FIG. 4 also includes determining (412), by the vehicle management module (402) in dependence upon the physical location information (410) for one or more surrounding vehicles (418, 422), whether one or more surrounding vehicles (418, 422) are located within the area of space surrounding the subject vehicle (420) that is bounded by the one or more critical sight lines (406). The vehicle management module (402) may determine (412) whether one or more surrounding vehicles (418, 422) are located within the area of space surrounding the subject vehicle (420) that is bounded by the one or more critical sight lines (406) by comparing the physical location information (410) for one or more surrounding vehicles (418, 422) to information describing the area of space surrounding the subject vehicle (420) that is bounded by the one or more critical sight lines (406). In such an example, if the physical location information (410) for a particular surrounding vehicle (418) indicates that the surrounding vehicle (418) is within the area of space surrounding the subject vehicle (420) that is bounded by the one or more critical sight lines (406), the subject vehicle (420) may be unable to monitor the particular surrounding vehicle (418) to determine, for example, whether the particular surrounding vehicle (418) has swerved, decelerated rapidly, or otherwise presented a potential hazard to the subject vehicle (420).

The example method depicted in FIG. 4 also includes altering (416) a location of the subject vehicle (420) relative to at least one of the surrounding vehicles (418, 422). In the example method depicted in FIG. 4, altering (416) a location of the subject vehicle (420) relative to at least one of the surrounding vehicles (418, 422) is carried out in response to affirmatively (414) determining that one or more surrounding vehicles (418, 422) are located within the area of space surrounding the subject vehicle (420). Altering (416) the location of the subject vehicle (420) relative to at least one of the surrounding vehicles (418, 422) may be carried out, for example, by the vehicle management module (402) instructing the subject vehicle (420) to accelerate, decelerate, switch lanes, and so on. Alternatively, altering (416) the location of the subject vehicle (420) relative to at least one of the surrounding vehicles (418, 422) may also be carried out by the vehicle management module (402) instructing one of the surrounding vehicles (418, 422) to accelerate, decelerate, switch lanes, or otherwise change its location relative to the subject vehicle (420). In such a way, the vehicle management module (402) may select one of the vehicles (418, 420, 422) that is an autonomous vehicle to accelerate, decelerate, switch lanes, or otherwise change the relative positioning of the vehicles (418, 420, 422) such that none of the surrounding vehicles (418, 422) is travelling within the area that is bound by the critical sight lines (406) for the subject vehicle (420).

Figure 5:
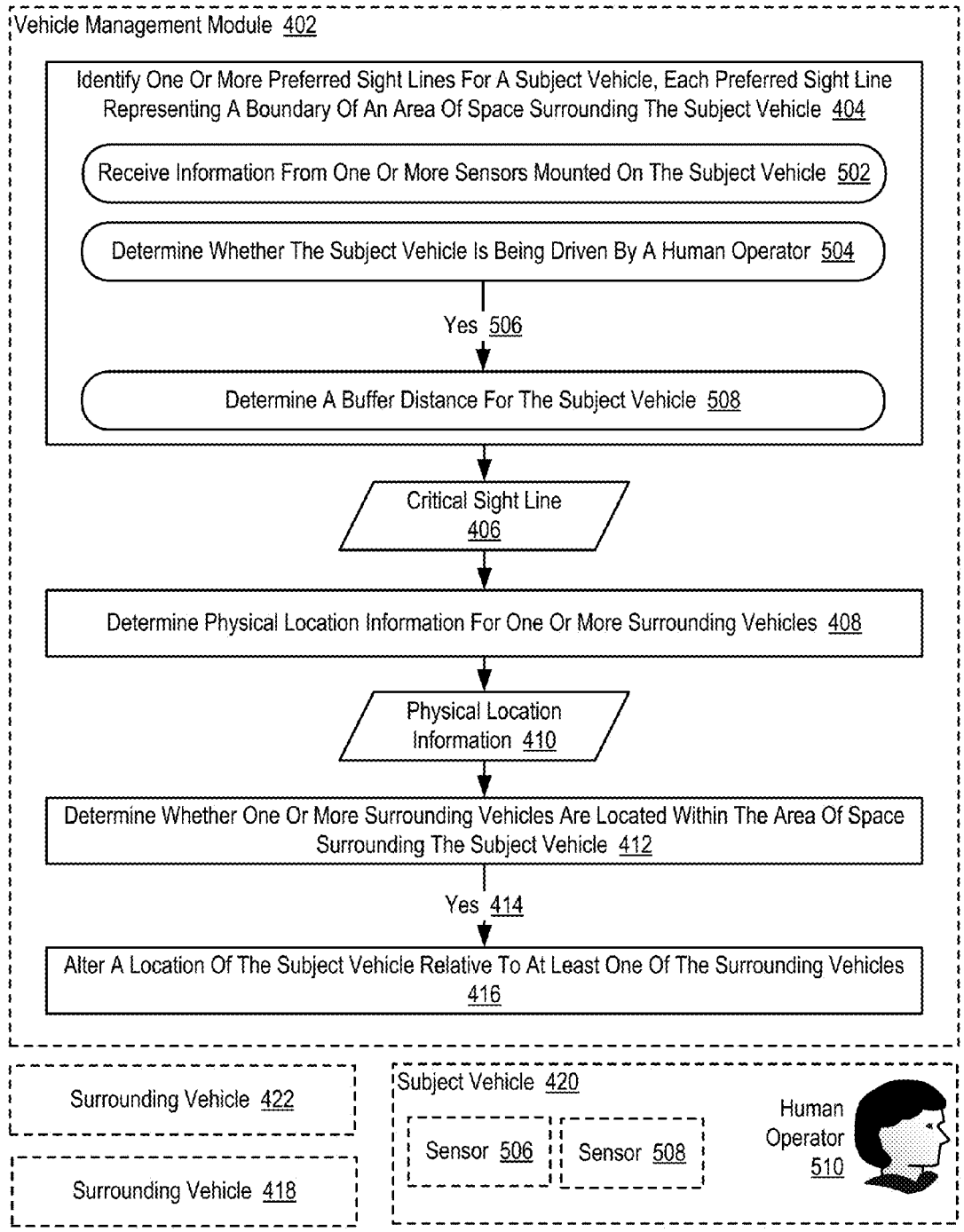
FIG. 5 sets forth a flow chart illustrating an additional example method for positioning autonomous vehicles based on field of view according to embodiments of the present invention.

For further explanation, FIG. 5 sets forth a flow chart illustrating an additional example method for positioning autonomous vehicles based on field of view according to embodiments of the present invention. The example method depicted in FIG. 5 is similar to the example method depicted in FIG. 4, as the example method depicted in FIG. 5 also includes identifying (404) one or more critical sight lines (406) for a subject vehicle (420), determining (408) physical location information (410) for one or more surrounding vehicles (418, 422), determining (412) whether one or more surrounding vehicles (418, 422) are located within the area of space surrounding the subject vehicle (420), and altering (416) a location of the subject vehicle (420) relative to at least one of the surrounding vehicles (418, 422).

In the example method depicted in FIG. 5, identifying (404) one or more critical sight lines (406) for a subject vehicle (420) can include receiving (502), by the vehicle management module (402), information from one or more sensors (506, 508) mounted on the subject vehicle (420). The one or more sensors (506, 508) mounted on the subject vehicle (420) may be embodied, for example, as a radar sensor, a photoelectric sensor, an infrared sensor, or other sensor. In such an example, information that is received from the one or more sensors (506, 508) mounted on the subject vehicle (420) may include, for example, the distance between the one or more sensors (506, 508) and a detected object such as one of the surrounding vehicles (418, 422), the angle between the one or more sensors (506, 508) and a detected object such as one of the surrounding vehicles (418, 422), and so on. The vehicle management module (402) may receive (502) such information from the one or more sensors (506, 508) mounted on the subject vehicle (420) via a wired data communications link between the vehicle management module (402) and the one or more sensors (506, 508), via a wireless data communications link between the vehicle management module (402) and the one or more sensors (506, 508), via a data communications network that the vehicle management module (402) and the one or more sensors (506, 508) are connected to, and so on.

In the example method depicted in FIG. 5, identifying (404) one or more critical sight lines (406) for a subject vehicle (420) can alternatively include determining (504), by the vehicle management module (402), whether the subject vehicle (420) is being driven by a human operator (510). Readers will appreciate that in the event that the subject vehicle (420) is being driven by a human operator (510), the subject vehicle (420) may not be able to respond to environmental stimuli as quickly as would be possible if the subject vehicle (420) were an autonomous vehicle. As such, two autonomous vehicles may be able to safely travel while being very small distances apart from each other because of the ability of an autonomous vehicle to quickly sense a change in its environment (e.g., a car in front of the autonomous vehicle applying its brakes and slowing down) through a plurality of sensor, process such changes, and take appropriate actions (e.g., applying its own brakes), whereas a vehicle that is operated by a human driver can require a greater distance between proximate vehicles. Surrounding vehicles (418, 422) should therefore be positioned a safe distance from a subject vehicle (420) that is being driven by a human operator (510). For example, upon affirmatively determining (504) that the subject vehicle (420) is being driven by a human operator (510), critical sight lines (406) may be established such that no autonomous vehicles are to travel within a predetermined distance of the subject vehicle (420).

Determining (504) whether the subject vehicle (420) is being driven by a human operator (510) may be carried out in a variety of ways. For example, the vehicle management module (402) may detect that the subject vehicle (420) is in a manual mode. Likewise, the vehicle management module (402) may detect that control mechanisms such as a steering wheel, gas pedal, brake pedal, or other control mechanism is being physically manipulated. The vehicle management module (402) may also determine (504) that the subject vehicle (420) is being driven by a human operator (510) by receiving an image or other sensed information from one of the surrounding vehicles (418, 422) that indicates that the subject vehicle (420) has a human driver in the subject vehicle (420), and in other ways as will occur to those of skill in the art.

In the example method depicted in FIG. 5, identifying (404) one or more critical sight lines (406) for a subject vehicle (420) can also include determining (508), by the vehicle management module (402), a buffer distance for the subject vehicle (420). In the example method depicted in FIG. 5, the buffer distance defines an area of space surrounding the subject vehicle (420) in which autonomous vehicles are prohibited from travelling. The vehicle management module (402) can determine (508) a buffer distance for the subject vehicle (420) based on a variety of factors including, for example, the speed at which the subject vehicle (420) is travelling, various performance characteristics of the subject vehicle (420) such as the rate at which the subject vehicle (420) can decelerate, various performance characteristics of vehicles travelling near the subject vehicle (420), the capabilities of various sensors that are mounted on the subject vehicle (420), and so on. The buffer distance for the subject vehicle (420) may be determined (508) so as to ensure that two or more autonomous vehicles that are travelling in proximity of each other can avoid a collision if one of the autonomous vehicles needs to brake, change lanes, or otherwise alter its driving patterns.

Figure 6:
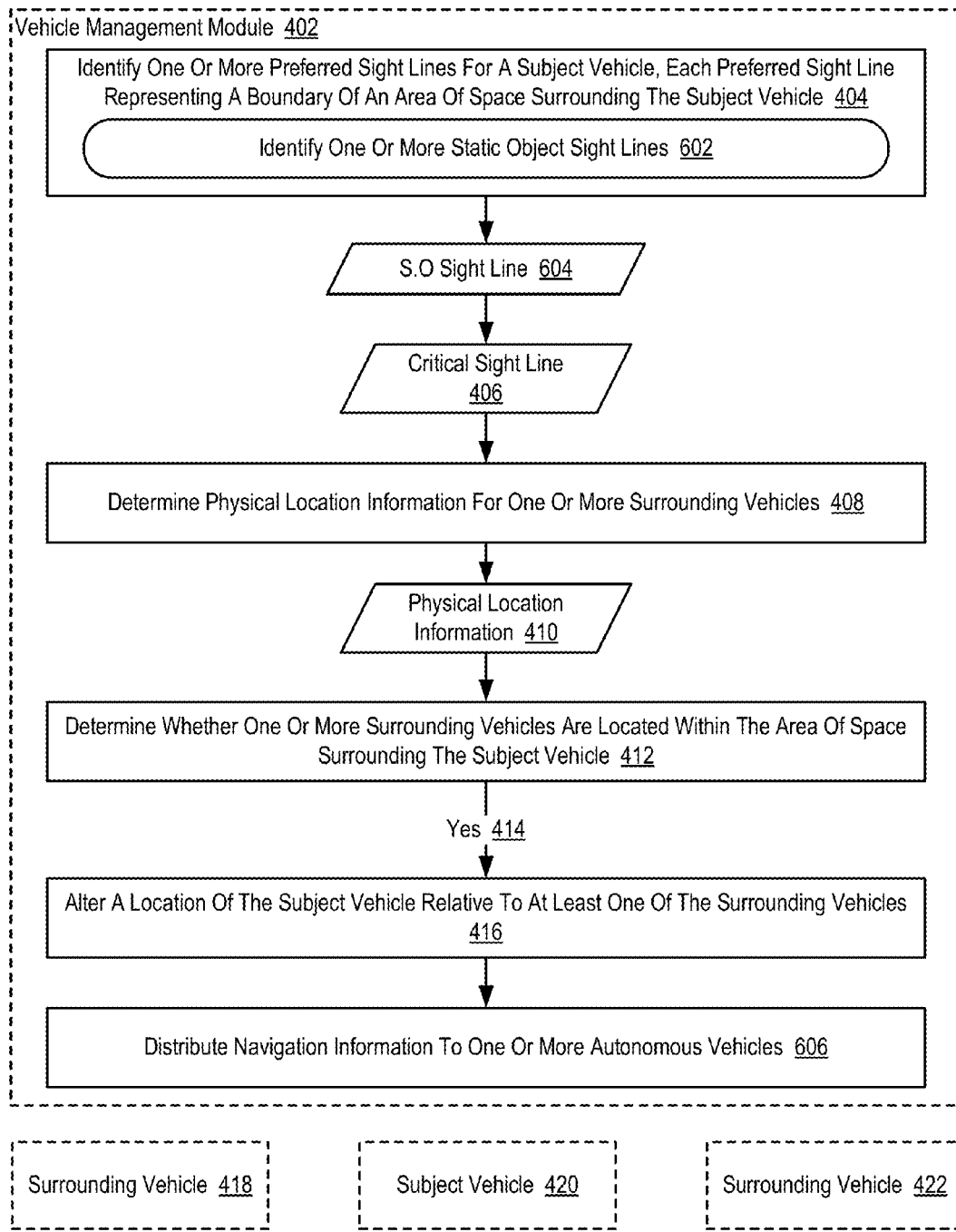
FIG. 6 sets forth a flow chart illustrating an additional example method for positioning autonomous vehicles based on field of view according to embodiments of the present invention.

For further explanation, FIG. 6 sets forth a flow chart illustrating an additional example method for positioning autonomous vehicles based on field of view according to embodiments of the present invention. The example method depicted in FIG. 6 is similar to the example method depicted in FIG. 4, as the example method depicted in FIG. 6 also includes identifying (404) one or more critical sight lines (406) for a subject vehicle (420), determining (408) physical location information (410) for one or more surrounding vehicles (418, 422), determining (412) whether one or more surrounding vehicles (418, 422) are located within the area of space surrounding the subject vehicle (420), and altering (416) a location of the subject vehicle (420) relative to at least one of the surrounding vehicles (418, 422).

In the example method depicted in FIG. 6, identifying (404) one or more critical sight lines (406) for a subject vehicle (420) can include identifying (602), by the vehicle management module (402), one or more static object sight lines (604). Each static object sight line (604) in FIG. 6 represents a boundary of an area of space surrounding the subject vehicle (420) for sensing static objects. Static object sight lines (604) may include predetermined areas of space surrounding the subject vehicle (420) that should remain empty to enable the subject vehicle (420) to sense static objects such as traffic lights, stop signs, or other static objects that are in fairly uniform locations. For example, the vehicle management module (402) may identify (602) an area 100 feet directly in front of the vehicle's direction of travel, between 10 feet and 20 feet above the street surface, as being bound by one or more static object sight lines (604) such that the subject vehicle (420) can sense traffic lights that are likely to be found in such a location relative to the subject vehicle (420). In such an example, by identifying (602) such static object sight lines (604), the subject vehicle (420) can keep such an area free of obstructions by avoiding travelling so closely behind another vehicle that the area of space bound by the static object sight lines (604) is obstructed from being sensed by one or more sensors in the subject vehicle (420). Readers will appreciate that other areas, such as those locations where traffic signs and other static objects would typically be located, may also be identified (602) as being bound by one or more static object sight lines (604).

The example method depicted in FIG. 6 also includes distributing (606), by the vehicle management module (402), navigation information to one or more autonomous vehicles. Navigation information can be distributed (606) by the vehicle management module (402) to one or more autonomous vehicles, for example, via a data communications network that the one or more autonomous vehicles are connected to, via a point-to-point data communications link between the vehicle management module (402) and the one or more autonomous vehicles, and so on. Such navigation information can include, for example, measurements taken by one or more sensors on the subject vehicle (420), information describing the one or more critical sight lines (406) for the subject vehicle (420), information describing the subject vehicle (420) such as the size of the subject vehicle (420), performance capabilities of the subject vehicle (420), and any other information useful in coordinating the relative locations of the subject vehicle (420) and the surrounding vehicles (418, 422).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions on a computing device:
identifying one or more critical sight lines for a subject vehicle including determining an angle between one of one or more sensors of the subject vehicle and a portion of one of one or more blocking vehicles blocking the one or more sensors, wherein each critical sight line represents a boundary of an area of space adjacent to the subject vehicle and identifies a line between the one or more sensors and edges of the one or more blocking vehicles, the edges of the one or more blocking vehicles blocking the one or more sensors from monitoring a section of the area of space adjacent to the subject vehicle located on the opposite side of the one or more blocking vehicles relative to the one or more sensors;
determining physical location information for one or more surrounding vehicles;
determining, in dependence upon the physical location information for the one or more surrounding vehicles, whether the one or more of the surrounding vehicles are located within the section of the area of space adjacent to the subject vehicle located on the opposite side of the one or more blocking vehicles; and
responsive to determining that the one or more surrounding vehicles are located within the section of the area of space adjacent to the subject vehicle located on the opposite side of the one or more blocking vehicles, altering a location of the subject vehicle relative to at least one of the surrounding vehicles in dependence upon the critical sight lines and the received physical location information for the one or more surrounding vehicles.

2. The method of claim 1 wherein identifying one or more critical sight lines for the subject vehicle further comprises receiving information from one or more sensors mounted on the subject vehicle.

3. The method of claim 1 wherein identifying one or more critical sight lines for the subject vehicle further comprises identifying one or more static object sight lines, each static object sight line representing a boundary of an area of space surrounding the subject vehicle for sensing static objects.

4. The method of claim 1 further comprising distributing navigation information to one or more autonomous vehicles.

5. An apparatus comprising a computer processor and a computer memory operatively coupled to the computer processor, the computer memory having disposed within it computer program instructions that, when executed by the computer processor, cause the apparatus to carry out the steps of:
identifying one or more critical sight lines for a subject vehicle including determining an angle between one of one or more sensors of the subject vehicle and a portion of one of one or more blocking vehicles blocking the one or more sensors, wherein each critical sight line represents a boundary of an area of space adjacent to the subject vehicle and identifies a line between the one or more sensors and edges of the one or more blocking vehicles, the edges of the one or more blocking vehicles blocking the one or more sensors from monitoring a section of the area of space adjacent to the subject vehicle located on the opposite side of the one or more blocking vehicles relative to the one or more sensors;

determining physical location information for one or more surrounding vehicles;

determining, in dependence upon the physical location information for the one or more surrounding vehicles, whether the one or more of the surrounding vehicles are located within the section of the area of space adjacent to the subject vehicle located on the opposite side of the one or more blocking vehicles; and responsive to determining that the one or more surrounding vehicles are located within the section of the area of space adjacent to the subject vehicle located on the opposite side of the one or more blocking vehicles, altering a location of the subject vehicle relative to at least one of the surrounding vehicles in dependence upon the critical sight lines and the received physical location information for the one or more surrounding vehicles.

6. The apparatus of claim 5 wherein identifying one or more critical sight lines for the subject vehicle further comprises receiving information from one or more sensors mounted on the subject vehicle.

7. The apparatus of claim 5 wherein identifying one or more critical sight lines for the subject vehicle further comprises identifying one or more static object sight lines, each static object sight line representing a boundary of an area of space surrounding the subject vehicle for sensing static objects.

8. The apparatus of claim 5 further comprising computer program instructions that, when executed by the computer processor, cause the apparatus to carry out the step of distributing navigation information to one or more autonomous vehicles.

9. A computer program product including a computer readable storage medium that is not a signal, the computer program product comprising computer program instructions stored on the computer readable storage medium that, when executed, cause a computer to carry out the steps of:

identifying one or more critical sight lines for a subject vehicle including determining an angle between one of one or more sensors of the subject vehicle and a portion of one of one or more blocking vehicles blocking the one or more sensors, wherein each critical sight represents a boundary of an area of space adjacent to the subject vehicle and identifies a line between the one or more sensors and edges of the one or more blocking vehicles, the edges of the one or more blocking vehicles blocking the one or more sensors from monitoring a section of the area of space adjacent to the subject vehicle located on the opposite side of the one or more blocking vehicles relative to the one or more sensors;

determining physical location information for one or more surrounding vehicles;

determining, in dependence upon the physical location information for the one or more surrounding vehicles, whether the one or more of the surrounding vehicles are located within the section of the area of space adjacent to the subject vehicle located on the opposite side of the one or more blocking vehicles; and responsive to determining that the one or more surrounding vehicles are located within the section of the area of space adjacent to the subject vehicle located on the opposite side of the one or more blocking vehicles, altering a location of the subject vehicle relative to at least one of the surrounding vehicles in dependence upon the critical sight lines and the received physical location information for the one or more surrounding vehicles.

10. The computer program product of claim 9 wherein identifying one or more critical sight lines for the subject vehicle further comprises receiving information from one or more sensors mounted on the subject vehicle.

11. The computer program product of claim 9 wherein identifying one or more critical sight lines for the subject vehicle further comprises identifying one or more static object sight lines, each static object sight line representing a boundary of an area of space surrounding the subject vehicle for sensing static objects.

12. The computer program product of claim 9 further comprising computer program instructions that, when executed, cause the computer to carry out the step of distributing, by the vehicle management module, navigation information to one or more autonomous vehicles.

* * * * *